April 1, 1952 — H. F. LYNCH ET AL — 2,591,451
DEVICE FOR REMOVING RESTORATIONS FROM TEETH
Filed April 28, 1951

INVENTORS
HARLD F. LYNCH AND
JAMES F. SMITH
BY Scott L. Norvied
atty

Patented Apr. 1, 1952

2,591,451

UNITED STATES PATENT OFFICE 2,591,451

DEVICE FOR REMOVING RESTORATIONS
FROM TEETH

Harold F. Lynch and James F. Smith,
Phoenix, Ariz.

Application April 28, 1951, Serial No. 223,568

3 Claims. (Cl. 32—43)

This invention pertains to a device for removing restorations from teeth to which they have been bonded.

One of the objects of the device is to remove restoration such as crowns, inlays, and fixed bridges, which have been cemented or bonded to tooth structure, without distortion of the restoration or fracture of the tooth structure.

Another object is to provide a restoration remover which has a threaded attaching element which may be screwed into the occlusal surface of a restoration to attain firm attachment thereto, and a removing element operating within said attaching element which will apply sufficient force to the tooth structure to remove the restoration without distorting it and without damaging the tooth structure.

Other objects will appear hereinafter.

We attain the foregoing objects by means of the devices, structure and combination of parts illustrated in the accompanying drawing, in which—

Similar numerals refer to similar parts in the several views.

Figure 3:
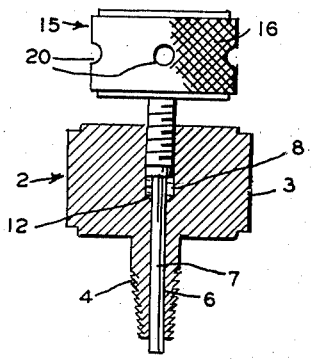
Figure 3 is a mid-sectional elevation of the remover.
Figure 4:
Figure 4 is an elevational view of the pressure pin.

The attaching element body 2 is composed of a knurled thumb nut or head 3 from which a self tapping attaching screw 4 depends axially. This screw tapers slightly toward its outer end and is provided with flutes 5 to aid in thread cutting. The threads are preferably of the buttress form as shown particularly in Figure 3. Body 2 is drilled axially to provide a hole 6 in the attaching screw 4 and lower part of nut 3 to receive pressure pin 7. In the upper part of the nut 3 this hole is enlarged at 8 and threaded to receive the threaded shank 14 of the removing element 15. The shank 14 is surmounted by a knurled nut head 16.

Pressure pin 7 has a shank 9 which has a sliding fit in hole 6, and a head 10 which will slide within hole portion 8 but will be retained by shoulder 12 at the bottom of portion 8.

Head 3 is drilled radially at several positions to form holes 18 to receive a wrench pin. Head 16 is likewise provided with radially drilled wrench holes 20.

In use the occlusal surface of restoration 26 is drilled at 22 to provide a hole of a proper size to receive the self tapping attaching screw 4. Use is made of nut 3 to tap the screw fully and firmly into the restoration 26. The threading may be started with the fingers and a pin wrench applied to holes 18 when necessary. After the attaching element 2 has been firmly attached to the restoration 26 pressure pin 7, which should be in place in hole 6 when this operation was commenced, is forced to bear on tooth structure 27 by application of pressure on its head 10. This is done by screwing threaded shank 14 in the threaded portion 8. The lower end of shank 14 engages the head 10 of pin 7 and forces the pin outward and downward from body 2.

Figure 1:
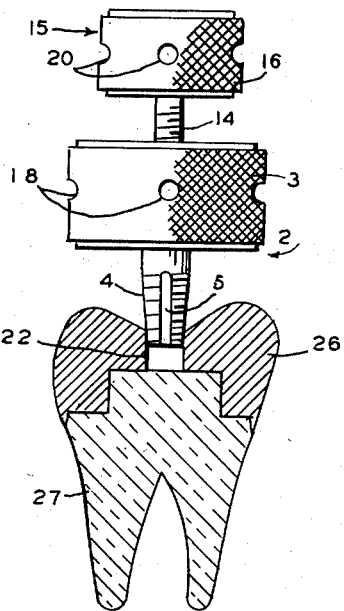
Figure 1 is a side elevational view of one exemplification of our crown and inlay remover, shown as applied to an inlay on a tooth, with the inlay and tooth shown in section, all parts being drawn on an enlarged scale.
Figure 2:
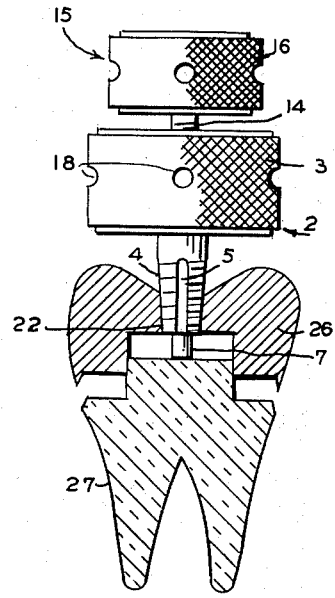
Figure 2 is a similar view of the parts shown in Figure 1 but with the parts of the remover moved to lifting position.

The lower end of pin 7 presses on the top face of tooth structure 27 and at the same time the restoration 26 is lifted from this structure as shown in Figure 2. To complete separation, pins 7 of several lengths may be used, if necessary. However, after screw 4 is once attached to the restoration, it is seldom necessary to remove it for any purpose. It is to be understood that the lower end of this screw does not bear on or forcibly engage tooth structure 27.

As herein mentioned and described the head 3 and self tapping screw 4 may be termed the attaching element, and head 16, screw 14 and pin 7 may be termed the removing element.

Having fully described our invention and explained its use we wish to be limited only by the following claims.

We claim:

1. A tooth restoration remover composed of an attaching element body composed of a head and a depending self tapping screw having an axial bore there thru enlarged and tapped at the end portion within said body, and a removing element, including a pressure pin retained within said bore so that its lower end extends from the lower end of said self tapping screw, and a screw having a head with a threaded depending shank adapted to screw into the threaded portion of the axial bore in said body head and force said pressure pin downward so that its lower end is forcibly extended from the lower end of said self tapping screw.

2. A restoration remover, including in combination, a cylindrical body having a knurled perimeter and an axially positioned self tapping attaching screw depending therefrom, said body and screw having an axial bore enlarged at the upper and tapped to receive a screw; a pressure pin slidably operative within said axial bore with its lower end adapted to extend from the lower end of said attaching screw, and a retaining head at its upper end adapted to slide in the enlarged portion of said axial bore and not enter the lower portion of said bore; and a removing screw having a knurled head and a threaded shank adapted to screw into the threaded portion of the axial bore of said cylindrical body and contact the head of said pressure pins so as to force the lower end of said pin out of the lower end of said self tapping attaching screw.

3. A restoration remover, comprising in combination, an attaching element including a cylindrical head, an axially disposed attaching screw depending therefrom having a tapered buttress thread, and an axial bore with the upper portion thereof enlarged and tapped and a shoulder formed at the bottom of said enlarged bore; a pressure pin having a cylindrical shank slidably fitting in the enlarged portion of said axial bore, and a head slidably fitting in the enlarged portion of said bore and adapted to be retained in said bore by said shoulder; and a removing element having a cylindrical knurled head and an axially extending screw adapted to screw into said threaded portion of the axial bore in said attaching element, and engage the head of said pressure pin therein and force the lower end of said pressure pin outward from the lower end of said attaching screw.

HAROLD F. LYNCH.
JAMES F. SMITH.

REFERENCES CITED

The following references are of record in the file of this patent:

UNITED STATES PATENTS

| Number | Name | Date |
|---|---|---|
| 1,041,098 | Kenney | Oct. 15, 1912 |
| 1,102,850 | Arden | July 7, 1914 |